(12) United States Patent
Heeszel et al.

(10) Patent No.: US 10,794,259 B2
(45) Date of Patent: Oct. 6, 2020

(54) METHOD AND APPARATUS FOR COOLING THE IMPULSE MECHANISM OF A VIBRATORY DEVICE

(71) Applicant: Astec Industries, Inc., Chattanooga, TN (US)

(72) Inventors: Gary Heeszel, Eugene, OR (US); Richard Raley, Cottage Grove, OR (US); Luke Rubalcava, Albany, OR (US); Matt Lundervold, Sandy, OR (US)

(73) Assignee: Astec Industries, Inc., Chattanooga, TN (US)

( * ) Notice: Subject to any disclaimer, the term of this patent is extended or adjusted under 35 U.S.C. 154(b) by 325 days.

(21) Appl. No.: 15/730,094

(22) Filed: Oct. 11, 2017

(65) Prior Publication Data
US 2018/0128154 A1   May 10, 2018

Related U.S. Application Data

(60) Provisional application No. 62/407,606, filed on Oct. 13, 2016.

(51) Int. Cl.
| | |
|---|---|
| *F01P 5/06* | (2006.01) |
| *B07B 1/28* | (2006.01) |
| *B07B 1/42* | (2006.01) |
| *B06B 1/16* | (2006.01) |
| *A01D 34/00* | (2006.01) |

(52) U.S. Cl.
CPC ............... *F01P 5/06* (2013.01); *B07B 1/284* (2013.01); *B07B 1/42* (2013.01); *A01D 34/003* (2013.01); *B06B 1/166* (2013.01)

(58) Field of Classification Search
CPC ... B07B 1/284; B07B 1/42; F01P 5/06; B06B 1/166; A01D 34/003
See application file for complete search history.

(56) References Cited

U.S. PATENT DOCUMENTS

| | | | | |
|---|---|---|---|---|
| 4,905,461 | A * | 3/1990 | Heuer | A01D 34/003 56/12.8 |
| 5,489,156 | A * | 2/1996 | Martinie | F16C 35/073 384/538 |
| 5,762,176 | A * | 6/1998 | Patterson | B06B 1/166 198/766 |
| 6,267,700 | B1 * | 7/2001 | Takayama | F02B 61/02 474/144 |
| 7,070,527 | B1 * | 7/2006 | Saagge | F16H 55/56 474/93 |
| 2009/0298627 | A1 * | 12/2009 | Johnson | F16H 9/18 474/93 |
| 2011/0007990 | A1 * | 1/2011 | Kawamura | C10M 115/08 384/322 |

* cited by examiner

*Primary Examiner* — Connor J Tremarche
(74) *Attorney, Agent, or Firm* — Chambliss, Bahner & Stophel, P.C.; Stephen D. Adams (57) ABSTRACT

An impulse mechanism for a vibratory device includes an eccentrically weighted shaft that is adapted to be rotated to create vibratory forces. A fan component is mounted on the eccentrically weighted shaft. The fan component has a plurality of fan blades spaced around its periphery.

5 Claims, 8 Drawing Sheets

METHOD AND APPARATUS FOR COOLING THE IMPULSE MECHANISM OF A VIBRATORY DEVICE

CROSS-REFERENCE TO RELATED APPLICATION

This application claims the benefit of U.S. Provisional Patent Application No. 62/407,606 which was filed on Oct. 13, 2016.

FIELD OF THE INVENTION

The present invention relates generally to vibratory devices such as vibratory screen assemblies for classifying materials by particle size, and vibratory feeders used to regulate material flow. More particularly, the invention relates to a method and apparatus for cooling the impulse mechanism that generates the vibratory motion of the vibratory device.

BACKGROUND OF THE INVENTION

Vibratory screen assemblies are used to classify and separate material into two or more differently sized products. A typical vibratory screen assembly is comprised of one or more screen decks which attach to a screen frame that includes a pair of side plates. Each screen deck includes a sizing medium such as wire cloth. The sizing media has openings that dictate the largest sized material particle that can pass through the media. An impulse mechanism is provided to generate vibrational motion and to impart such motion to the screen deck(s) of the screen assembly. This vibration is design to stratify the material as it flows across the media and to expose the material particles to the media openings. Material to be classified by particle size flows across the length of each screen deck, and generally, at least some of it passes through the sizing media as the impulse mechanism vibrates the screen deck. The vibrations imparted to the screen deck cause material small enough to pass through the media to pass through to a lower screen deck or transfer chute or conveyor. It also helps to convey the material across the screen deck and prevents material build-up on the sizing media. The screen assembly is supported by springs which isolate the assembly from a screen base.

Vibrating feeders are used to convey material at a specified rate and can also be used to classify and separate material into two or more different particle sizes. Material is typically loaded or transferred onto a pan assembly that has rear and side walls and a pan floor. An impulse mechanism is attached to the pan assembly which is supported on a base component by springs. Similar to that provided for a vibrating screen assembly, an impulse mechanism is used to vibrate the vibrating feeder, thereby agitating the material being conveyed.

Vibratory screen and feeder impulse mechanisms have one or more shafts that are supported by bearings. Eccentrically mounted weights are supported by bearings on the shafts. Single or multiple motors power the shafts using a power transmission device such as a belt drive. If a single motor is employed to rotate multiple shafts, the belt drive may be attached to a sheave on a drive shaft, and the rotation imparted by the belt drive to the drive shaft may be transmitted to one or more additional shafts by a gear assembly or by additional belt drives. During operation of the vibratory device, the motor(s) rotate the shafts, causing the eccentrically mounted weights to rotate, thereby generating centrifugal force which is transmitted through the bearings to the vibratory screen assembly or feeder body that is supported by springs mounted on a base. This centrifugal radial force causes the vibratory screen assembly or feeder body to vibrate and the amplitude of the vibration is termed the "stroke".

Different stroke patterns can be achieved by different combinations of shafts carrying eccentrically mounted weights, and by modifying the timing or phase angle between the angular orientations of the eccentrically mounted weights on the shafts. A single shaft or multiple shafts with the eccentrically mounted weights timed to rotate with the phase angle will produce a circular stroke pattern which is frequently used on inclined screens. When two shafts with eccentrically mounted weights are timed using gears between the shafts so that one shaft rotates in a rotational direction opposite to that of the other, a linear stroke pattern is produced such as is used on vibrating feeders. An elliptical stroke pattern can be generated by timing three shafts, each with eccentrically mounted weights, using gear or belt drive mechanisms where two shafts are timed to rotate in the same rotational direction and phase angle and a third shaft rotates in the opposite rotational direction and is set to a different phase angle. Horizontal vibratory screen assemblies use the elliptical stroke pattern to stratify the material and convey the material from the feed end to the discharge end of the screen.

The impulse mechanism can be positioned above, below or within the vibratory device, and is usually located near the center of mass for the vibrating components. If the impulse mechanism generates a linear or elliptical stroke, it can be located along the stroke axis that passes through the center of mass of the vibrating components. The impulse mechanism's bearings and power transmission components such as gears require proper lubrication of oil or grease. One or more enclosures for these components (sometimes referred to as a wheel case) encompasses the shafts, bearings, timing and power transmission gears and the eccentrically mounted weights. During operation, the bearings and power transmission components of the impulse mechanism generate heat. In conventional vibratory devices, this heat is dissipated continually through the wheel case by natural convection. If the heat is not properly dissipated, however, the temperature within the wheel case and at the bearings and power transmission components can exceed the acceptable temperature for the lubrication oil or grease. This will cause a breakdown of the lubrication oil film on the bearings and power transmission components, thereby damaging the components and generating even more heat within the wheel case.

Proper cooling of the impulse mechanism has been a continual problem due to many issues, including a demand for larger or faster running screens, and an increase in the use of vibratory devices to screen hot materials and in hot climates. In response to customer requests, larger vibratory screen assemblies are being designed. These larger screen assemblies can impose more load and force onto the impulse mechanisms, thereby generating more heat than what can be dissipated through the wheel case by natural convection. Some customer applications require the ability to size material that is at an elevated temperature, such as, for example, hot sand that is produced in a dryer used to extract moisture from the sand. Heat from the material being processed is transmitted into the screen. This additional heat elevates the operational temperature of the screen media, decks, vibrating structure and impulse mechanisms.

It is known to add coolant coils carrying a liquid coolant, or electrical fans to conventional impulse mechanisms to dissipate heat from the wheel case. However, vibrations generated by the impulse mechanism are transmitted to all components of the wheel case, so that any connections of coolant hoses or electrical wiring to the screen deck or wheel case are subjected to intense vibration. This vibration causes rapid flexing of the coolant hoses or electrical wiring that can lead to fatigue failure of these components.

Heat transfer cooling fins have been attached to the exterior of the wheel case to improve the convection heat transfer from the wheel case in order to reduce the internal wheel case operating temperature; however in some applications, this method does not dissipate enough heat to effectively reduce the internal wheel case temperature to an acceptable range. When a vibratory screen or feeder is used for aggregate processing, rock can bounce off the screen deck or fall from the feeder sides and impact the wheel case. Consequently, cooling fins or other cooling mechanisms mounted on the exterior of the wheel case must be able to withstand the impact of falling rock.

An additional constraint on cooling of the wheel case is the access area near the wheel case. Vibratory screens and feeders are often mounted on a portable chassis having limited width for walkway access, so that any cooling fin or other extrusion extending outward of the wheel case may infringe upon the walkway access, thereby limiting or constraining access to the vibratory device and thereby creating a safety hazard.

It would be desirable if a method and apparatus could be provided that would provide cooling to the impulse mechanism of a vibratory device without the disadvantages of conventional cooling systems.

Advantages of the Invention

Among the advantages of a preferred embodiment of the invention is that it provides a method and apparatus for cooling the impulse mechanism of a vibratory device without adding conventional cooling systems or fans. Another advantage of one embodiment of the invention is that it does not extend the dimensions of the wheel case of the impulse mechanism beyond conventional limits. Still another advantage of a preferred embodiment of the invention is that it provides a method and apparatus for improving the heat dissipation from vibrating equipment using components that are contained within the impulse mechanism. Yet another advantage of a preferred embodiment of the invention is that it provides an apparatus for cooling the wheel case of a vibratory device that is able to withstand rock impact. Other advantages and features of this invention will become apparent from an examination of the drawings and the ensuing description.

Notes on Construction

The use of the terms "a", "an", "the" and similar terms in the context of describing the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic.

Terms concerning attachments, coupling and the like, such as "connected" and "interconnected", refer to a relationship wherein structures are secured or attached to one another either directly or indirectly through intervening structures, as well as both moveable and rigid attachments or relationships, unless specified herein or clearly indicated by context. The term "operatively connected" is such an attachment, coupling or connection that allows the pertinent structures to operate as intended by virtue of that relationship.

The use of any and all examples or exemplary language (e.g., "such as" and "preferably") herein is intended merely to better illuminate the invention and the preferred embodiments thereof, and not to place a limitation on the scope of the invention. Nothing in the specification should be construed as indicating any element as essential to the practice of the invention unless so stated with specificity. The following terms are specifically defined, and are to be given their broadest reasonable construction consistent with such definitions, as follows:

The term "centrifugal force" describes an apparent inertial force in a rotating coordinate system that is directed outwardly from the axis of rotation and acts as an equal opposing effect to the actual centripetal force.

The term "vibratory device" refers to a machine that is adapted to impart vibratory forces to particulate material in order to convey and/or separate it into various size fractions. A vibratory device includes an impulse mechanism with one or more shafts that are rotated in the process of generating vibratory forces. Vibratory devices include vibratory screen assemblies for classifying materials by particle size, and vibratory feeders used to regulate material flow.

The term "impulse mechanism" refers to an assembly that operates to generate vibratory forces in a vibratory device. An impulse mechanism includes a rotatable shaft having eccentrically mounted weights thereon, and a drive sheave that is mounted on the shaft. An impulse mechanism may also include a wheel case that encloses bearings which support the shaft.

The term "drive shaft" refers to a shaft of an impulse mechanism on which a drive sheave is mounted, which drive sheave is operatively attached by a drive belt directly to a motor in such a manner that the motor may rotate the shaft.

SUMMARY OF THE INVENTION

The invention comprises a fan for a shaft of an impulse mechanism for a vibratory device. The fan is mounted on the shaft and includes a plurality of fan blades that are spaced around its periphery. The fan may be mounted on any rotatable shaft that is a part of the impulse mechanism; however, it is preferably combined with a drive sheave and mounted to an eccentrically weighted drive shaft of the impulse mechanism.

The invention is particularly adapted for use in connection with an impulse mechanism for a vibratory screen or feeder that contains one or more eccentrically weighted shafts which are supported by bearings and are adapted to rotate to produce centrifugal forces for vibration. Such eccentrically weighted shafts and supporting bearings may be enclosed by a wheel case which contains lubrication for the bearings and power transmission components that generate heat during operation. A preferred embodiment of the invention comprises a combination drive sheave and fan that draws air through the center of the combination drive sheave and fan, and accelerates the air as the fan blades redirect the air flow by 90° and disperse the air flow radially from the center of the combination drive sheave and fan. The increased air flow across the wheel case increases convection heat dissipation from the wheel case, thereby lowering the operating temperature of the wheel case.

Another embodiment of the invention includes ducting of the fan air flow to improve convection heat dissipation from the wheel case. Still another embodiment of the invention incorporates fan ducting into a sheave guard, thereby reducing the overall width of the screen assembly and avoiding infringing on walkway access or transport width dimensions of the vibratory device.

The preferred embodiment of the invention is quite reliable, arising from the simple mechanical configuration of the combination drive sheave and fan. This embodiment of the invention can operate without problems in the dusty environment near the screen assembly. In addition, several embodiments of the invention are adapted to withstand impact from falling rock and aggregate without failure.

In order to facilitate an understanding of the invention, the preferred embodiments of the invention, as well as the best mode known by the inventors for carrying out the invention, is illustrated in the drawings, and a detailed description thereof follows. It is not intended, however, that the invention be limited to the particular embodiments described or to use in connection with the apparatus illustrated herein. Therefore, the scope of the invention contemplated by the inventors includes all equivalents of the subject matter described herein, as well as various modifications and alternative embodiments such as would ordinarily occur to one skilled in the art to which the invention relates. The inventors expect skilled artisans to employ such variations as seem to them appropriate, including the practice of the invention otherwise than as specifically described herein. In addition, any combination of the elements and components of the invention described herein in any possible variation is encompassed by the invention, unless otherwise indicated herein or clearly excluded by context.

BRIEF DESCRIPTION OF THE DRAWINGS

The presently preferred embodiments of the invention are illustrated in the accompanying drawings, in which like reference numerals represent like parts throughout, and wherein.

DESCRIPTION OF THE PREFERRED EMBODIMENTS OF THE INVENTION

This description of preferred embodiments of the invention is intended to be read in connection with the accompanying drawings, which are to be considered part of the entire written description of this invention. The drawing figures are not necessarily to scale, and certain features of the invention may be shown exaggerated in scale or in somewhat schematic form in the interest of clarity and conciseness.

Figure 1:
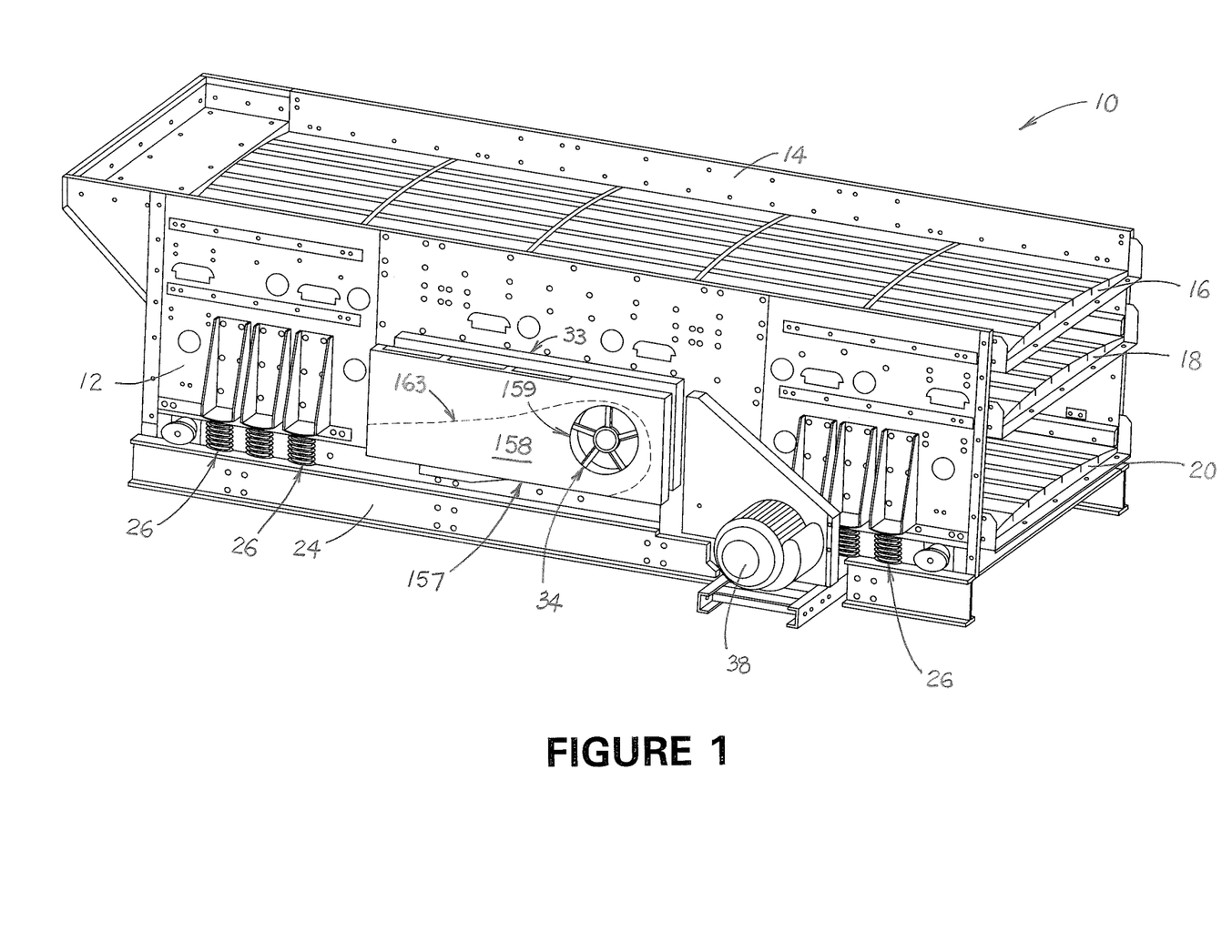
FIG. 1 is a side perspective view of a vibratory screen assembly which has been modified to include a preferred embodiment of the invention.

Vibratory screen assembly 10 is shown in FIG. 1. Vibratory screen assembly 10 is comprised of side plates 12 and 14 and three screen decks 16, 18 and 20 that are connected to the side plates by fasteners, by welding or by other means known to those having ordinary skill in the art to which the invention relates. Each screen deck includes sizing media that is adapted to allow material of a particular particle size to pass through. Of course the invention may also be applied to vibratory screen assemblies having one, two, or more than three screen decks, as well as to a vibratory feeder having a feeder pan instead of a screen deck. The combination of side plates 12 and 14 and screen decks 16, 18 and 20 is commonly referred to as a screen basket or body. A combination of side plates and a pan floor on a vibratory feeder (not shown) is referred to as a pan assembly.

An impulse mechanism 22 is mounted to vibratory screen assembly 10, and is adapted to generate vibratory forces to vibrate the screen basket (or the pan assembly of a vibratory feeder) during operation. The screen basket (or the pan assembly of a vibratory feeder) is supported and isolated from base structure 24 by springs 26. These springs vertically support the screen basket (or pan assembly) in compression or tension. The springs can also be adapted or configured and arranged to support the screen from horizontal movement, if desired. Typical spring designs include coiled steel, rubber core with reinforcing cords, leaf springs, tension springs and rubber torsion springs that compress the rubber mechanically when subject to torsion.

Impulse mechanism 22 comprises drive shaft 27, and shafts 28 and 29, all of which have weight assemblies 30 that are eccentrically mounted thereon. In other embodiments of the invention (not shown), eccentric weight assemblies may be integrally formed with the shafts of the impulse mechanism. Each of shafts 27, 28 and 29 is supported by bearings 32 (shown in FIG. 3) that are coupled to each of side plates 12 and 14 within a wheel case mounted on the outside of each of the side plates, including wheel case 33 that is mounted on the outside of side plate 12 (shown in FIGS. 2 and 3). Wheel case 33 comprises an enclosure that includes side cover 34 (shown in FIG. 3, but removed for clarity from FIG. 2).

Figure 2:
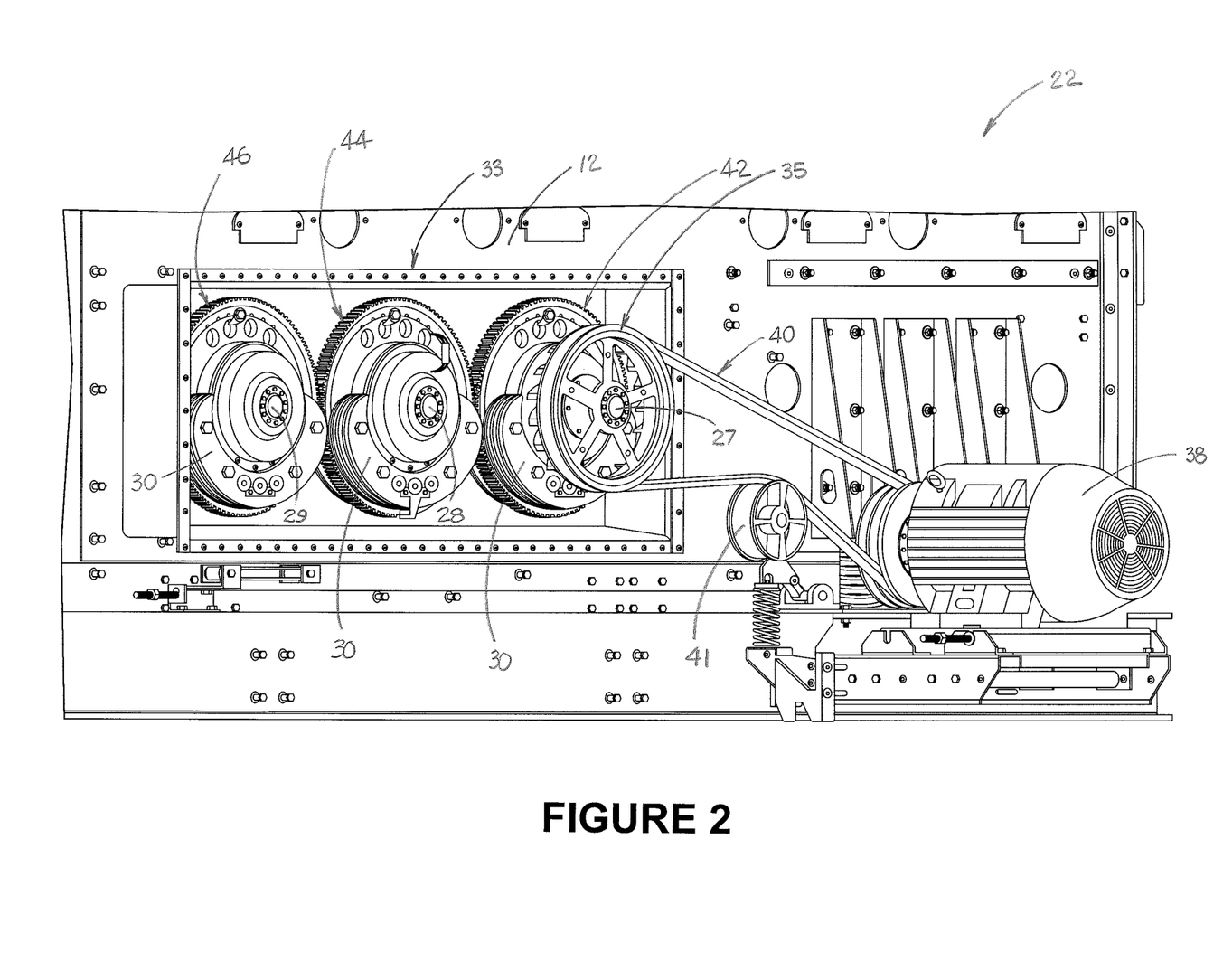
FIG. 2 is a side perspective view of the components of the impulse mechanism of the vibratory screen assembly shown in FIG. 1, with the side cover of the wheel case and the guard removed.

In the preferred embodiment of the invention, eccentrically mounted weight assemblies 30 are located on each side of the screen basket, i.e., in wheel case 33 on the outside of side plate 12 (shown in FIG. 2) and in a wheel case (not shown) on the outside of side plate 14. When weight assemblies of equal mass are located in this manner and in the configuration illustrated in FIG. 2, the impulse mechanism provides equal weight on each side of the impulse mechanism and equal radial position timing for the shafts of the impulse mechanism. During operation of impulse mechanism 22, shafts 27, 28 and 29 rotate and transfer rotational motion to the eccentrically mounted weights. Thus, as shown in FIG. 2, combination drive sheave and fan 35 is mounted on drive shaft 27, and the drive sheave component 36 of combination drive sheave and fan 35 is operatively attached to motor 38 by drive belt 40. Spring tensioned idler sheave 41 maintains proper tension in drive belt 40 while the screen basket is vibrating, and it accommodates the movements of the screen basket. Power transmission gears 42, 44 and 46 are used to transfer rotational motion to shafts 28 and 29 and to set the timing and direction of rotational motion to achieve the desired vibrational pattern of amplitude or stroke, and direction or angle of the major stroke axis of the screen basket. Thus, power transmission gear 42 is mounted on drive shaft 27, which meshes with power transmission gear 44 on shaft 28 so that rotation of drive shaft 27 in one direction by motor 38 will cause shaft 28 to rotate in the opposite direction. Power transmission gear 46 on shaft 29 is also adapted to mesh with power transmission gear 44 on shaft 28 so that shaft 29 will rotate in the opposite direction to that of shaft 28 and in the same direction as drive shaft 27. Operation of impulse mechanism 22 in this manner causes the rotating eccentrically mounted weights to generate centrifugal forces that vibrate the screen basket.

Figure 3:
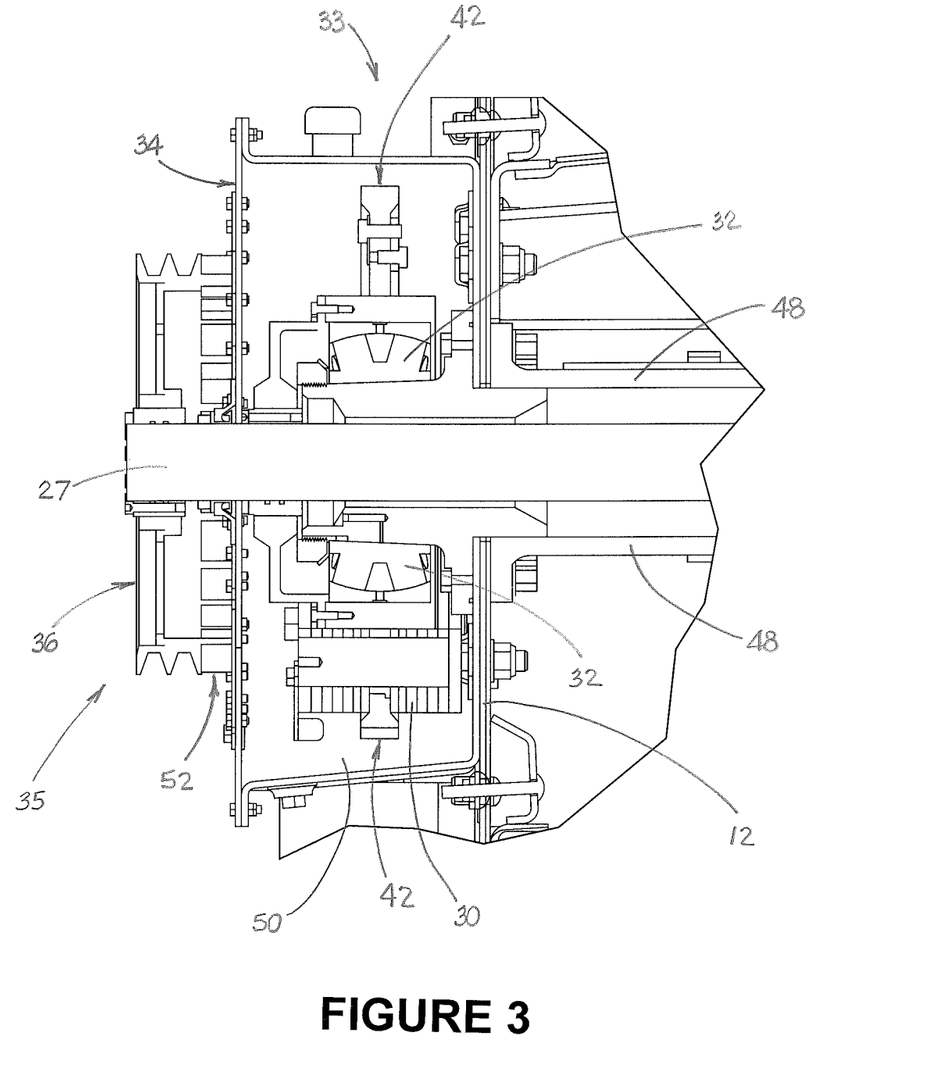
FIG. 3 is a sectional end view of a portion of the wheel case of the impulse mechanism including the drive shaft and the combination drive sheave and fan that is a part of a preferred embodiment of the invention.

One or more shaft tubes 48 (shown in FIG. 3) can be used to add support between side plates 12 and 14. These shaft tubes are mounted to the inner surface of each of the screen side plates and are typically concentric with the shafts of the impulse assembly, such as eccentrically weighted drive shaft 27, as shown in FIG. 3. The shaft bearings and gears within the wheel case, such as bearing 32 and gear 42 within wheel case 33, are typically lubricated with a lubricant such as gear oil that is contained within reservoir 50 that is defined by the wheel case. During operation of the vibratory device, bearings 32 and gears 42, 44 and 46 generate heat from friction. This heat is transferred into the lubrication oil within the reservoir in the wheel case, to the structural components of the wheel case, to the mechanical components of the impulse mechanism, and to screen side plates 12 and 14. Some of the heat generated is dissipated by the wheel case due to natural convention heat transfer from the large surface area of wheel case, including side cover 34.

Figure 4:
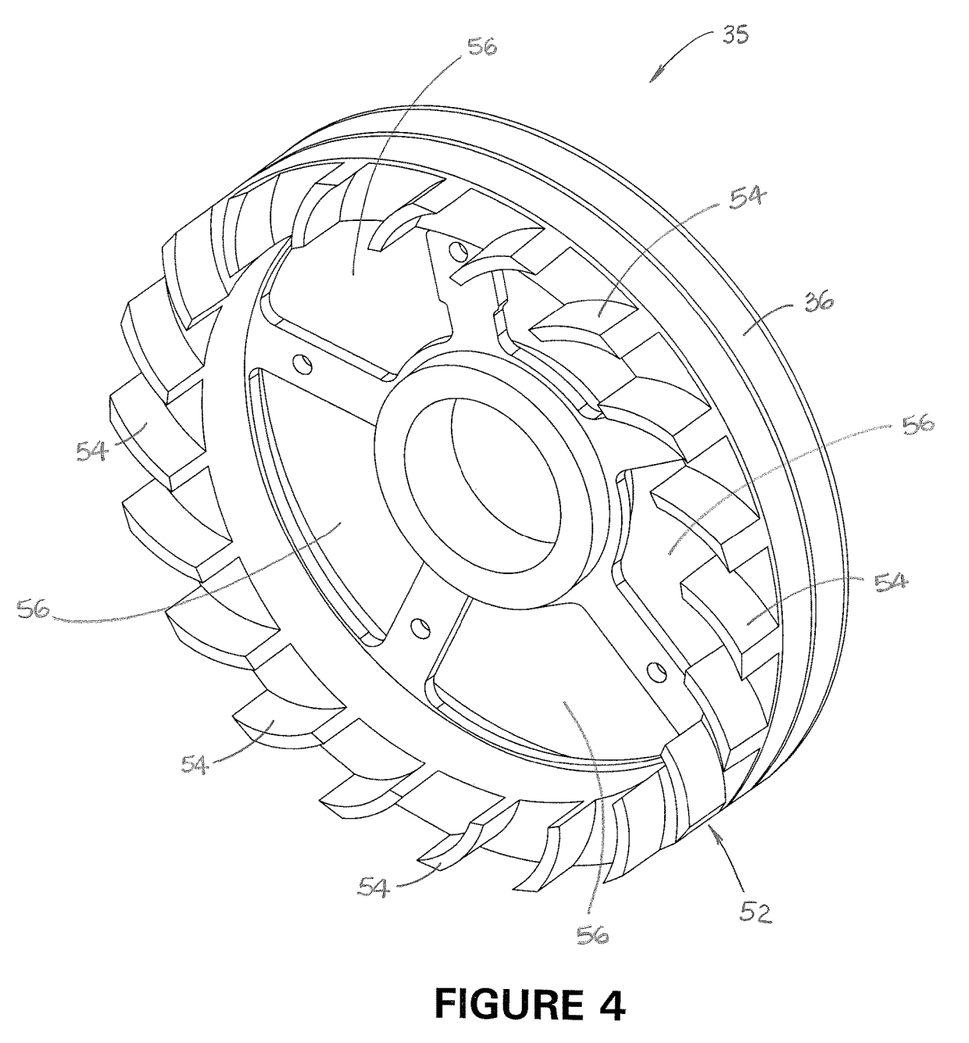
FIG. 4 is a side perspective view of a preferred embodiment of the combination drive sheave and fan that is a part of the invention.

According to a preferred embodiment of the invention, fan component 52 is combined with drive sheave component 36 to form a unitary structure comprising combination drive sheave and fan 35 (best shown in FIG. 4). Fan component 52 has a plurality of fan blades 54 spaced around its periphery which are adapted to accelerate and direct air movement across the outer surface (including side cover 34) of wheel case 33 as drive shaft 27 is rotated. Preferably, fan blades 54 of combination drive sheave and fan 35 are curved as shown in FIG. 4 to increase efficiency. The construction of fan blades 54, and their location on the inner side of combination drive sheave and fan 35 helps to insure that fan component 52 is also adapted to withstand impact from sand, pebbles and rocks that could enter into or otherwise contact combination drive sheave and fan 35.

Figure 5:
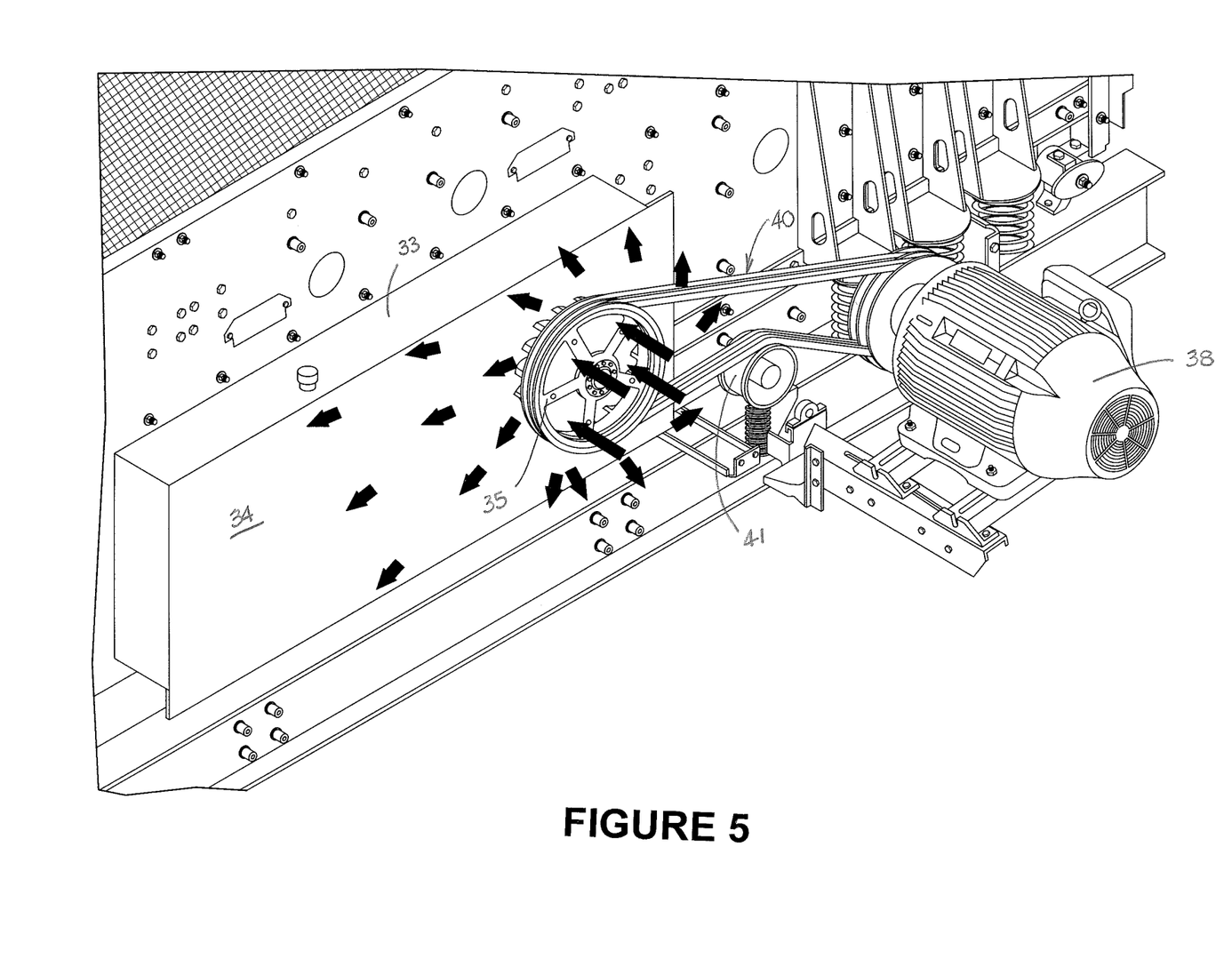
FIG. 5 is a side perspective view of a preferred embodiment of the combination drive sheave and fan that is a part of the invention, showing an air flow pattern that may be generated across the wheel case by the combination drive sheave and fan.

As shown in FIG. 5, combination drive sheave and fan 35 comprises a unitary structure including centrifugal fan component 52 that draws air through the openings 56 on the outer side of the combination drive sheave and fan, accelerates the air as the fan blades redirect the air flow by 90°, and disperses the air flow radially from the center of combination drive sheave and fan 35 across side cover 34 of wheel case 33.

In preferred embodiments of the invention, impulse mechanism 22 includes a guard having a guard side cover and comprising an enclosure that is mounted to the outside of wheel case 33 and adapted to generally enclose the combination drive sheave and fan 35 in order to protect it against impact from sand, pebbles, rocks and other materials that may be put into motion by the operation of the vibratory device.

Figure 6:
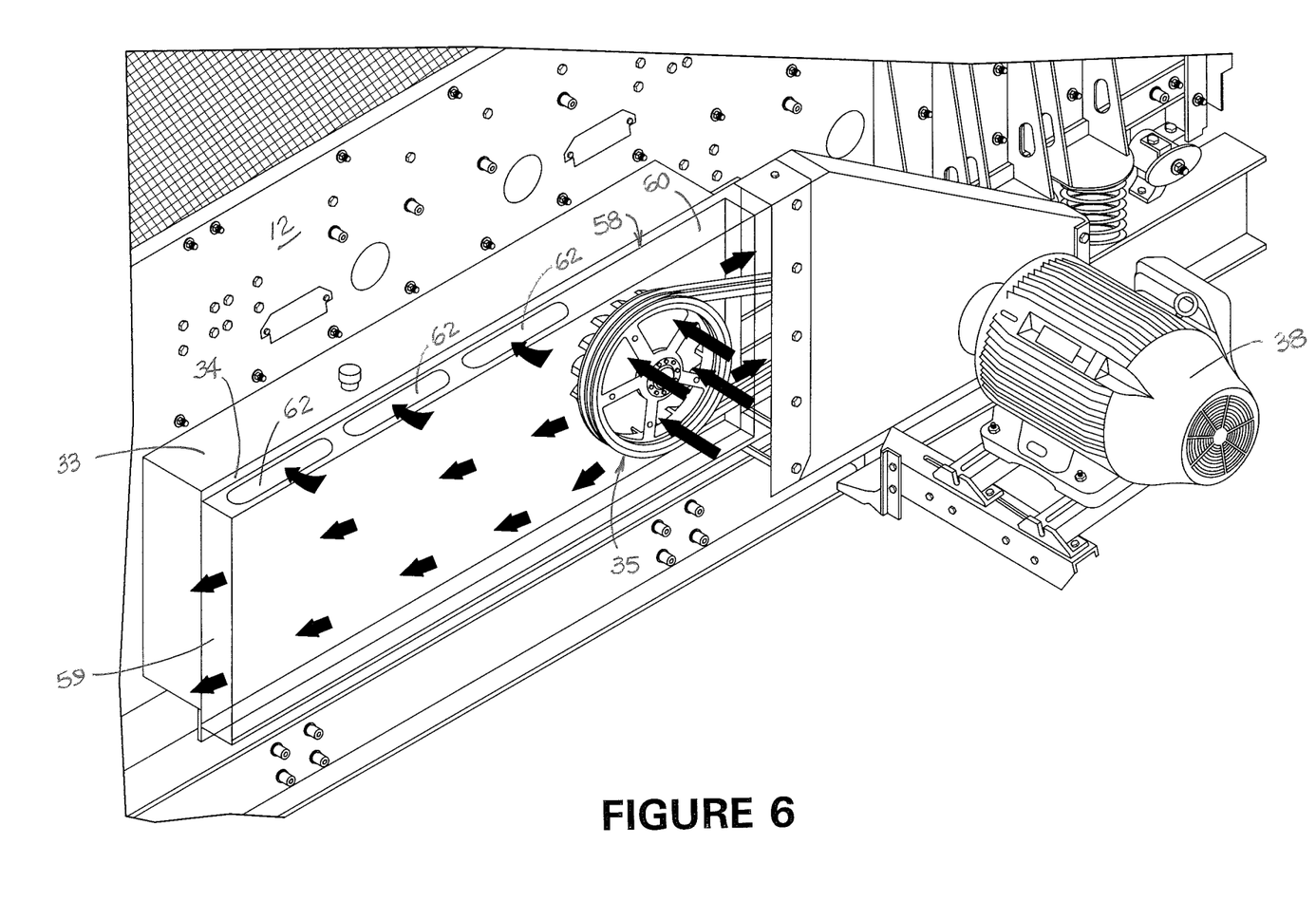
FIG. 6 is a side perspective view of a preferred embodiment of the combination drive sheave and fan that is a part of the invention, showing an air flow pattern that may be generated by the combination drive sheave and fan, using a first embodiment of air ducting in a guard.

A first embodiment of the guard is shown in FIG. 6. This embodiment comprises guard 58, comprising an enclosure having a guard side cover (not shown) that is generally parallel to side cover 34 of wheel case 33. This guard side cover (like guard side cover 158 shown in FIG. 1) includes an opening that allows outside air to be drawn into guard 58 by the rotation of combination drive sheave and fan 35. As shown in FIG. 6, guard 58 is open at end 59, providing an air outlet away from combination drive sheave and fan 35. Guard 58 also has a top wall 60 which is provided with a plurality of air outlets 62. This configuration of guard ducting and air outlets allows cooling air drawn into the guard by combination drive sheave and fan 35 to flow across the outer surface of side cover 34 of wheel case 33. A portion of this air flows out open end 59 of guard 58, and a portion flows out air outlets 62. The guard is mounted so as to be easily removed in order to change drive belt 40 and allow for inspection or adjustment of eccentrically mounted weights 30.

Figure 7:
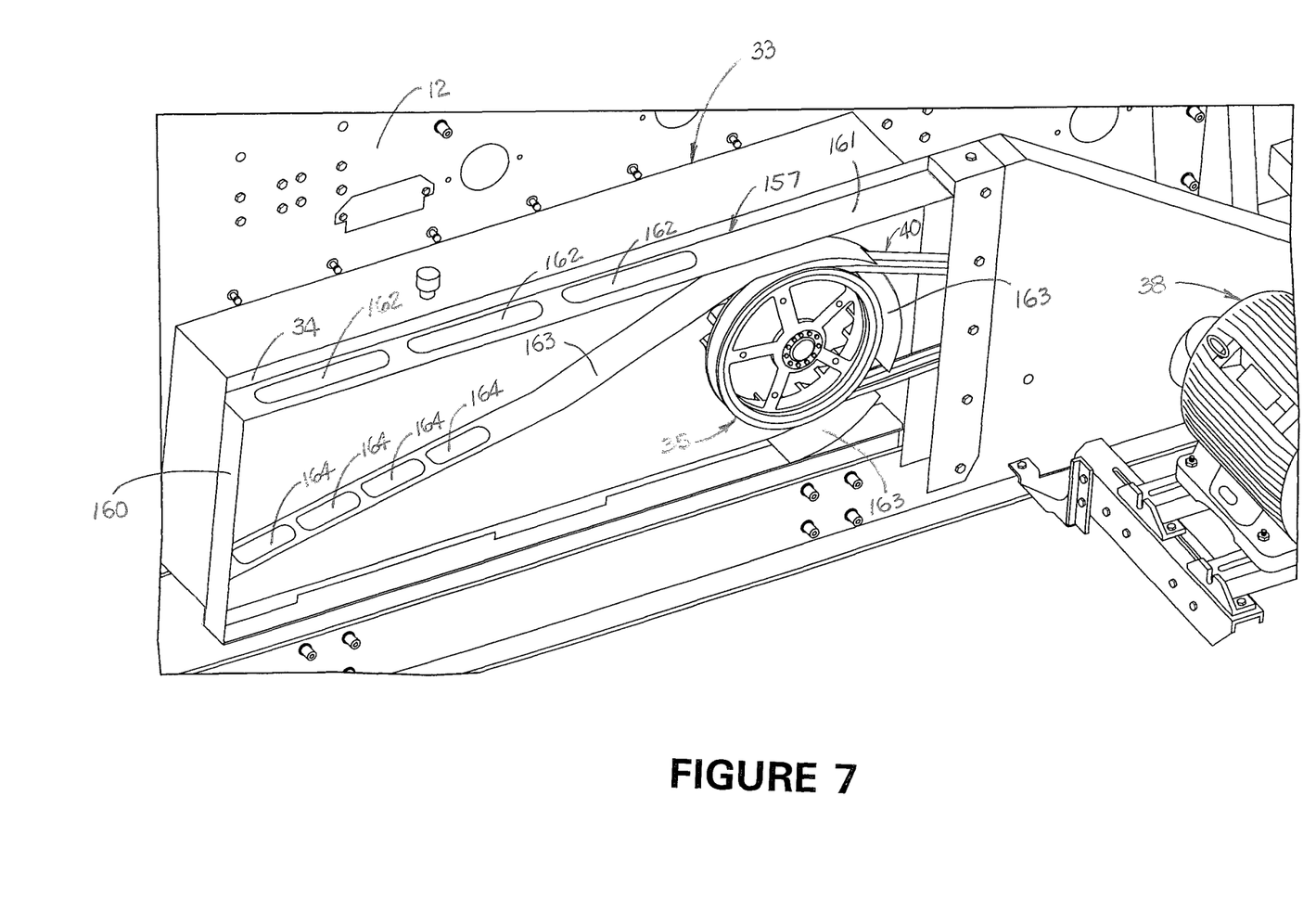
FIG. 7 is a side perspective view of a preferred embodiment of the combination drive sheave and fan that is a part of the invention, showing a second embodiment of air ducting in a guard.
Figure 8:
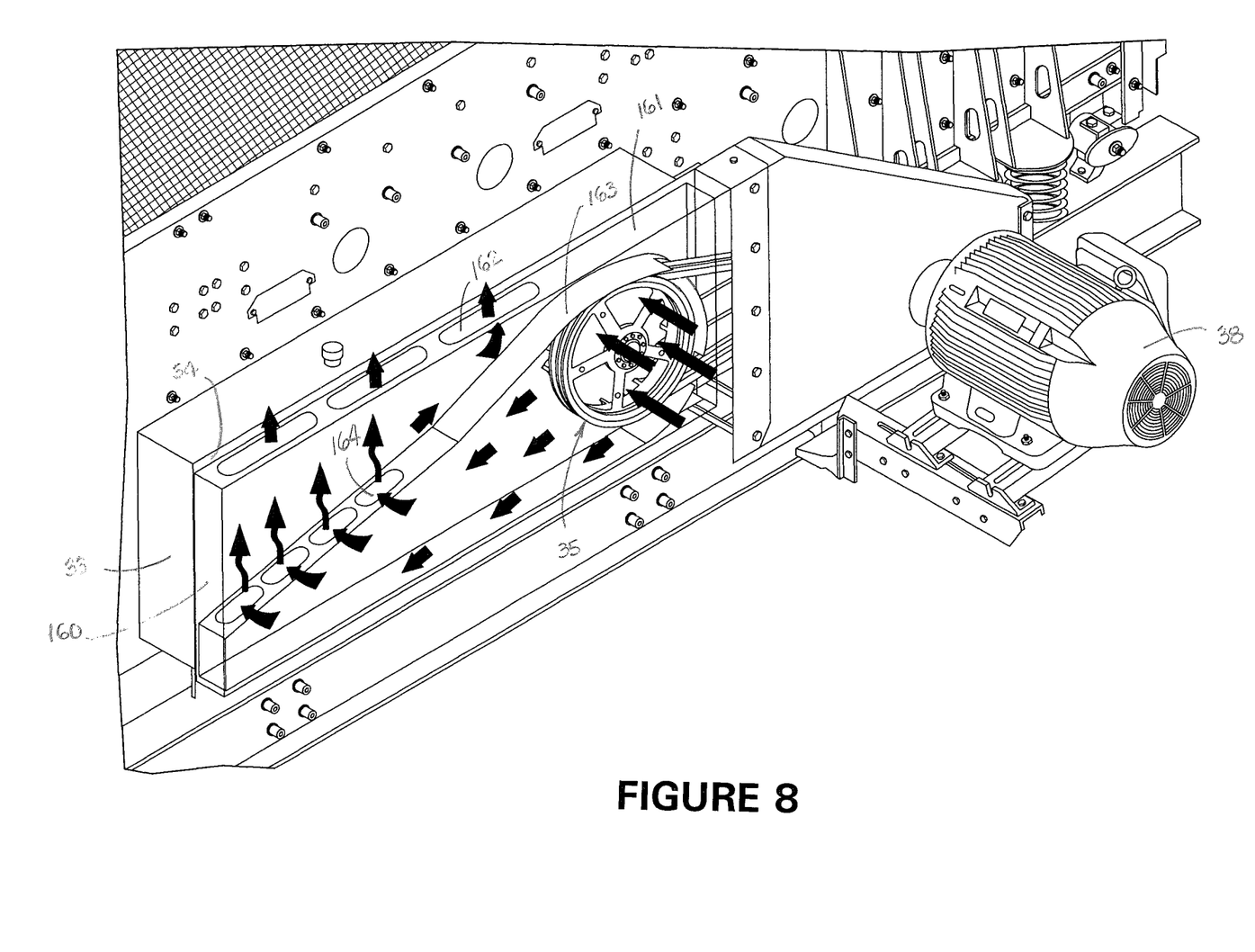
FIG. 8 is a side perspective view of a preferred embodiment of the combination drive sheave and fan that is a part of the invention, showing an air flow pattern that may be generated by the combination drive sheave and fan, using the air ducting in the guard that is shown in FIG. 7.

A second embodiment of the guard is shown in FIGS. 1, 7 and 8. As shown therein, guard 157 comprises an enclosure that is provided with guard side cover 158. Guard side cover 158 has a circular opening 159 that is aligned with combination drive sheave and fan 35 so as to allow outside air to be drawn into guard 157 by the rotation of combination drive sheave and fan 35. Unlike guard 58, guard 157 has a closed end 160; however, its top wall 161 is provided with a plurality of air outlets 162. Guard 157 also includes curved ducting 163 that wraps around the motor side of combination drive sheave and fan 35 and slopes downwardly from the top of combination drive sheave and fan 35 towards closed end 160. Ducting 163 has a plurality of upper air outlets 164 near the end of guard 157 away from combination drive sheave and fan 35. This configuration of guard ducting and air outlets allows cooling air drawn into the guard by combination drive sheave and fan 35 to flow across the outer surface of the lower portion of side cover 34 of wheel case 33 and then upwardly across the side cover through upper outlets 164 and through outlets 162 in the top wall of the guard after passing across the upper portion of the side cover for the wheel case. Because of the configuration of guard 157, it will accelerate air drawn through opening 159 across the side cover for the wheel case to a greater speed than does guard 58 to improve the convection heat transfer from the surface of the wheel case. The guard is mounted so as to be easily removed in order to change drive belt 40 and allow for inspection or adjustment of eccentrically mounted weights 30.

Although this description contains many specifics, these should not be construed as limiting the scope of the invention but as merely providing illustrations of the presently preferred embodiments thereof, as well as the best mode contemplated by the inventors of carrying out the invention. The invention, as described and claimed herein, is susceptible to various modifications and adaptations, as would be understood by those having ordinary skill in the art to which the invention relates.

What is claimed is:

1. An impulse mechanism for a vibratory device comprising:
    (a) an eccentrically weighted shaft having an eccentrically weighted drive shaft that is supported by bearings and that is adapted to be rotated to create vibratory forces;
    (b) a fan component that is mounted on the eccentrically weighted shaft, said fan component having a plurality of fan blades spaced around its periphery that curve radially around a portion of the shaft when the fan component is mounted on the shaft, wherein the fan component is combined with a drive sheave component to form a unitary structure comprising a combination drive sheave and fan having a motor side;
    (c) a drive belt that is operatively attached to the sheave component of the combination drive sheave and fan;
    (d) a wheel case having a wheel case side cover that encloses the bearings supporting the eccentrically weighted drive shaft, wherein the fan component of the combination drive sheave and fan is adapted to direct air across an outer surface of the wheel case side cover as the eccentrically weighted drive shaft is rotated;
    (e) a guard that is mounted to the outside of the wheel case and that is adapted to enclose the combination drive sheave and fan and is adapted to channel air moved by the fan blades of the combination drive sheave and fan across a lower portion of the wheel case side cover and then upwardly across the wheel case side cover and to accelerate the air moved by the fan blades of the combination drive sheave and fan to improve the convection heat transfer from the surface of the wheel case, the guard comprising:
        an enclosure that is adapted to protect the combination drive sheave and fan from impact by materials being processed by the vibratory device;
        a guard side cover for the enclosure that is generally parallel to the wheel case side cover, said guard side cover having an opening that allows outside air to be drawn into the guard by the rotation of the combination drive sheave and fan;
        a closed end of the enclosure spaced away from the combination drive sheave and fan;
        a top wall for the enclosure which is provided with a plurality of air outlets; and
        curved ducting that wraps around the motor side of the combination drive sheave and fan and slopes downwardly from the top of combination drive sheave and fan towards the closed end of the enclosure, which curved ducting has a plurality of upper air outlets near an end of the guard away from combination drive sheave and fan so that air is drawn into the guard by rotation of the combination drive sheave and fan and directed to flow across the outer surface of the lower portion of the side cover of the wheel case and then upwardly across the side cover through the upper outlets in the curved ducting and through the air outlets in the top wall of the enclosure after passing across the upper portion of the side cover for the wheel case.

2. The impulse mechanism of claim 1 wherein:
    (a) the combination drive sheave and fan has an outer side and an inner side;
    (b) the fan component of the combination drive sheave and fan is on the inner side of the combination drive sheave and fan;
    (c) the sheave component of the combination drive sheave and fan is on the outer side of the combination drive sheave and fan.

3. The impulse mechanism of claim 2 wherein the combination drive sheave and fan includes openings on its outer side through which air is drawn by rotation of the combination drive sheave and fan.

4. The impulse mechanism of claim 3 wherein the combination drive sheave and fan comprises a centrifugal fan component that:
    (a) draws air through the openings on the outer side of the combination drive sheave and fan;
    (b) accelerates the air as the fan blades redirect the air flow by 90°;
    (c) disperses the air flow radially from the center of the combination drive sheave and fan.

5. The impulse mechanism of claim 1 wherein the wheel case contains a lubricant.

* * * * *